(12) United States Patent
Yamaguchi et al.

(10) Patent No.: US 11,091,612 B2
(45) Date of Patent: Aug. 17, 2021

(54) THERMOPLASTIC ELASTOMER COMPOSITION AND USE THEREOF

(71) Applicant: MITSUI CHEMICALS, INC., Tokyo (JP)

(72) Inventors: Tomohiro Yamaguchi, Chiba (JP); Masakazu Jitsukata, Chiba (JP); Akihiro Yamamoto, Kawasaki (JP); Youhei Houtani, Ichihara (JP); Takahiro Yamada, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 166 days.

(21) Appl. No.: 16/491,094

(22) PCT Filed: Mar. 9, 2018

(86) PCT No.: PCT/JP2018/009179
§ 371 (c)(1),
(2) Date: Sep. 4, 2019

(87) PCT Pub. No.: WO2018/180362
PCT Pub. Date: Oct. 4, 2018

(65) Prior Publication Data
US 2020/0010653 A1    Jan. 9, 2020

(30) Foreign Application Priority Data

Mar. 31, 2017 (JP) .............................. JP2017-072019

(51) Int. Cl.
*B60J 10/76* (2016.01)
*C08L 23/06* (2006.01)
*B60J 10/15* (2016.01)

(52) U.S. Cl.
CPC .............. *C08L 23/06* (2013.01); *B60J 10/15* (2016.02); *B60J 10/76* (2016.02); *C08L 2205/025* (2013.01); *C08L 2205/035* (2013.01); *C08L 2207/04* (2013.01); *C08L 2207/062* (2013.01); *C08L 2207/068* (2013.01); *C08L 2207/324* (2013.01); *C08L 2310/00* (2013.01)

(58) Field of Classification Search
None
See application file for complete search history.

(56) References Cited

U.S. PATENT DOCUMENTS

| | | |
|---|---|---|
| 6,497,960 B1 | 12/2002 | Kobayashi et al. |
| 6,706,385 B1 | 3/2004 | Karaiwa |
| 8,063,146 B2 * | 11/2011 | Imai ................. C08L 23/02 525/191 |
| 9,109,065 B2 | 8/2015 | Ebata et al. |
| 10,047,201 B2 | 8/2018 | Hirose et al. |
| 2003/0059637 A1 * | 3/2003 | Imai ..................... C08L 23/06 428/515 |
| 2008/0182939 A1 * | 7/2008 | Morikawa ........... C08L 2666/02 525/221 |
| 2009/0239014 A1 * | 9/2009 | Noguchi ............... C08L 23/16 428/36.8 |
| 2009/0277095 A1 * | 11/2009 | Honda ..................... B60J 10/17 49/475.1 |
| 2010/0222479 A1 * | 9/2010 | Honda ................. C08K 5/0041 524/261 |
| 2010/0317758 A1 * | 12/2010 | Okuda .................... C08L 23/16 521/140 |
| 2012/0095154 A1 * | 4/2012 | Bernreitner .............. C08L 23/04 524/528 |
| 2013/0289212 A1 * | 10/2013 | Ikeda .................. C08L 23/0815 525/240 |
| 2018/0258266 A1 * | 9/2018 | Hu .......................... C08L 23/10 |

FOREIGN PATENT DOCUMENTS

| | | |
|---|---|---|
| JP | H10-193985 A | 7/1998 |
| JP | 2000-095900 A | 4/2000 |
| JP | 2001-001450 A | 1/2001 |
| JP | 2001-129942 A | 5/2001 |
| JP | 2011-190340 A | 9/2011 |
| JP | 2015-189088 A | 11/2015 |
| JP | 2015-189774 A | 11/2015 |
| KR | 10-2014-0001683 | 1/2014 |
| WO | WO-2013/054882 A1 | 4/2013 |
| WO | WO-2016/052029 A1 | 4/2016 |

OTHER PUBLICATIONS

Mitsui Chemicals, Inc.—"HI-ZEX MILLION"; Jun. 2011; p. 1-8.
Office Action dated Jun. 9, 2020 for corresponding Japanese Patent Application No. 2019-509152.
International Searching Authority, "International Search Report," issued in connection with International Patent Application No. PCT/JP2018/009179, dated Jun. 12, 2018.
International Searching Authority, "Written Opinion," issued in connection with International Patent Application No. PCT/JP2018/009179, dated Jun. 12, 2018.
Office Action dated Aug. 13, 2020 for corresponding South Korean Patent Application No. 10-2019-7026309.

* cited by examiner

*Primary Examiner* — Robert S Loewe
(74) *Attorney, Agent, or Firm* — Foley & Lardner LLP

(57) ABSTRACT

This invention relates to a thermoplastic elastomer composition comprising 5 to 30 parts by mass of ethylene-α-olefin-non-conjugated polyene copolymer (A), 20 to 40 parts by mass of crystalline olefin-based resin (B) having a density of 0.90 g/cm$^3$ or more and 0.92 g/cm$^3$ or less, 20 to 40 parts by mass of high-density polyethylene (C) having a density of 0.94 g/cm$^3$ or more and 0.97 g/cm$^3$ or less, 5 to 12 parts by mass of ethylene-α-olefin copolymer (D) consisting of ethylene and α-olefin having 3 to 12 carbon atoms, and 5 to 9 parts by mass of silicone compound (E) (with the total amount of (A), (B), (C), (D) and (E) being 100 parts by mass), and to an automotive glass run channel formed by the thermoplastic elastomer composition.

8 Claims, No Drawings

THERMOPLASTIC ELASTOMER COMPOSITION AND USE THEREOF

RELATED APPLICATIONS

The present application claims priority under 37 U.S.C. § 371 to International Patent Application No. PCT/JP2018/009179, filed Mar. 9, 2018, which claims priority to and the benefit of Japanese Patent Application No. 2017-072019, filed on Mar. 31, 2017. The contents of these applications are hereby incorporated by reference in their entireties.

TECHNICAL FIELD

The present invention relates to an olefin-based thermoplastic elastomer composition and use thereof.

BACKGROUND ART

Olefin-based thermoplastic elastomers are light in weight and easily recyclable, and also produce no deleterious gas at incineration, and therefore, widely used for automobile parts, industrial machinery parts, electric/electronic parts, construction materials, and the like, particularly as an alternative to vulcanized rubber from perspectives of energy conservation, resource conservation, and further recently, global environmental protection. An example of such automobile parts is glass run channel.

Glass run channel is a seal material disposed between a window glass and a window frame (guiding member) and required to have slideability to glass, and thus some conventional products contain a high amount of a silicone-based additive.

Nevertheless, in manufacturing process for glass run channels, extrusion-molded linear seal materials are inserted into a die for a corner part, and then injection molding forms a corner part and adheres the linear parts.

Patent Literature 1 describes a configuration in which a glass slide layer adhered to a glass run channel body contains high-density polyethylene, nonpolar elastomer, and a lubricant (silicone master batch), but does not refer to adhesion of a corner part.

Patent Literature 2 discloses that a glass run channel made of a composition of thermoplastic elastomer with silylated polyolefin incorporated therein has good adhesion between a base layer and a surface layer, and abrasion resistance.

CITATION LIST

Patent Literature

Patent Literature 1: JP Patent Publication (Kokai) No. 10-193985 A (1998) (particularly in Example 8)
Patent Literature 2: JP Patent Publication (Kokai) No. 2015-189088 A

SUMMARY OF INVENTION

Technical Problem

The present inventors examined adhesion of a corner part of a molded product obtained from an olefin-based thermoplastic elastomer composition containing a silicone-based additive, and found that a formulation containing a high amount of a silicone-based additive creates a problem in adherence on the corner part. Moreover, it is revealed that a silicone-based additive incorporated in a high amount also causes deterioration of low-temperature impact strength.

An object of the present invention is to provide an olefin-based thermoplastic elastomer composition which enables manufacture of a molded product such as a glass run channel that has balanced adhesion of a corner part and slideability of the molded product thus obtained.

Solution to Problem

Summary of the present invention is as follows.

(1) A thermoplastic elastomer composition comprising 5 to 30 parts by mass of ethylene-α-olefin-non-conjugated polyene copolymer (A), 20 to 40 parts by mass of crystalline olefin-based resin (B) having a density of 0.90 g/cm$^3$ or more and 0.92 g/cm$^3$ or less, 20 to 40 parts by mass of high-density polyethylene (C) having a density of 0.94 g/cm$^3$ or more and 0.97 g/cm$^3$ or less, 5 to 12 parts by mass of ethylene-α-olefin copolymer (D) consisting of ethylene and α-olefin having 3 to 12 carbon atoms, and 5 to 9 parts by mass of silicone compound (E) (with the total amount of (A), (B), (C), (D) and (E) being 100 parts by mass).

(2) The thermoplastic elastomer composition according to the above (1), wherein the silicone compound (E) comprises a silicone oil and a high-molecular-weight silicone.

(3) The thermoplastic elastomer composition according to the above (1) or (2), wherein the ethylene-α-olefin copolymer (D) comprises one or more selected from ethylene-octene rubber and ethylene-butene rubber.

(4) An automotive glass run channel formed from the thermoplastic elastomer composition according to any one of the above (1) to (3).

Advantageous Effects of Invention

The thermoplastic elastomer composition of the present invention allows to balance adhesion of a corner part and slideability of a molded product thus obtained, as well as enables manufacture of a molded product with good low-temperature impact strength such as a glass run channel.

Even one skilled in the art cannot anticipate that incorporation of ethylene-based resin e.g., high-density polyethylene and ethylene-α-olefin copolymer such as ethylene-octene rubber or ethylene-butene rubber, or the like would also provide slideability to be retained.

DESCRIPTION OF EMBODIMENTS

The thermoplastic elastomer composition of the present invention will be now specifically described below.

The thermoplastic elastomer composition of the present invention contains ethylene-α-olefin-non-conjugated polyene copolymer (A), crystalline olefin-based resin (B), high-density polyethylene (C), ethylene-α-olefin copolymer (D), and silicone compound (E).

[Ethylene-α-Olefin-Non-Conjugated Polyene Copolymer (A)]

The ethylene-α-olefin-non-conjugated polyene copolymer (A) used in the present invention is a copolymer comprising ethylene, α-olefin other than ethylene which is preferably α-olefin having 3 to 20 carbon atoms, non-conjugated polyene which is preferably non-conjugated diene.

The copolymer (A) can be manufactured by conventional known methods as described in "Porima Seizou Purosesu (Polymer production process) (published by Kogyo Chosakai Publishing Co., Ltd., p. 309-330)" or materials relevant to the application of the Applicant such as JP Patent Publication (Kokai) No. 9-71617 A (1997), JP Patent Publication (Kokai) No. 9-71618 A (1997), JP Patent Publication (Kokai) No. 9-208615 A (1997), JP Patent Publication (Kokai) No. 10-67823 A (1998), JP Patent Publication (Kokai) No. 10-67824 A (1998), JP Patent Publication (Kokai) No. 10-110054 A (1998), the pamphlet of International Publication No. WO 2009/081792, and the pamphlet of International Publication No. WO 2009/081794.

Examples of catalysts for olefin polymerization in manufacturing the ethylene-α-olefin-non-conjugated polyene copolymer (A) preferably used in the present invention include:

known Ziegler catalysts comprising transition metal compounds such as vanadium (V), zirconium (Zr) or titanium (Ti) and organoaluminum compounds (organoaluminum oxy-compound);

known metallocene catalysts comprising transition metal metallocene compounds selected from the fourth group of the periodic system of elements, and organoaluminum oxy-compounds or ionized ionic compounds, for example, a metallocene catalyst described in JP Patent Publication (Kokai) No. 9-40586 A (1997);

known metallocene catalysts comprising specific transition metal compounds and co-catalysts such as boron compounds, for example, a metallocene catalyst described in the pamphlet of International Patent Publication No. WO 2009/072553; and transition metal compound catalysts comprising specific transition metal compounds, and organic metal compounds, organoaluminum oxy-compounds, or compounds to react with the transition metal compound to form ion pairs, for example, a transition metal compound catalyst described in JP Patent Publication (Kokai) No. 2011-52231 A.

Particularly, use of metallocene catalysts can lead to homogeneous distribution of diene and provide high crosslinking efficiency even in poor incorporation of diene, and can also reduce chlorine content from the catalyst due to high catalytic activity, and therefore is particularly preferable.

The ethylene-α-olefin-non-conjugated polyene copolymer (A) used in the present invention has a content ratio of structural units (Ea mol %) derived from ethylene of typically 40 to 90 mol %, preferably 40 to 80 mol %, and a content ratio of structural units derived from α-olefin having 3 to 20 carbon atoms of typically 60 to 10 mol %, preferably 60 to 20 mol %, in 100 mol % of structural units derived from ethylene and structural units derived from α-olefin having 3 to 20 carbon atoms in total.

If the content ratio of structural units derived from ethylene and the content ratio of structural units derived from α-olefin having 3 to 20 carbon atoms fall within those ranges described above, there is an advantage in that a thermoplastic elastomer composition with good mechanical physical properties, rubber elasticity, cold resistance, and processability can be obtained. If the thermoplastic composition has a content ratio of structural units derived from ethylene is 90 mol % or less and a content ratio of structural units derived from α-olefin having 3 to 20 carbon atoms of 10 mol % or more, it has good flexibility, rubber elasticity at low temperature, and processability. If the thermoplastic composition has a content ratio of structural units derived from ethylene of 40 mol % or more and a content ratio of structural units derived from α-olefin having 3 to 20 carbon atoms of 60 mol % or less, it has good mechanical physical properties, rubber elasticity at high temperature. The content ratio of ethylene structural units of the ethylene-α-olefin-non-conjugated polyene copolymer (A) and the content ratio of α-olefin structural units can be measured by $^{13}$C-NMR method, for example, peaks can be identified and quantified according to the method described later and the method described in "Handbook of Polymer Analysis" (Asakura Publishing Co., Ltd., Published in 2008, the first edition, p. 184-211).

Specific examples of α-olefins having 3 to 20 carbon atoms include propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-1, 11-methyldodecene-1, and 12-ethyltetradecene-1. Among them, propylene, 1-butene, 4-methylpentene-1, 1-hexene, and 1-octene are preferable, and propylene is particularly preferable. These α-olefins are used singly or in combination of two or more thereof.

Specific examples of non-conjugated polyenes include linear non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene, and 4-ethylidene-1,7-undecadien; cyclic non-conjugated dienes such as methyltetrahydroindene, 5-ethylidene-2-norbornene, 5-methyl ene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene, and norbornadiene; and trienes such as 2,3-diisopropylidene-5-norbornene, 2-ethylidene-3-isopropylidene-5-norbornene, 2-propenyl-2,2-norbornadiene, and 4-ethylidene-8-methyl-1,7-nonadiene. Among them, 5-ethylidene-2-norbornene, 5-vinyl-2-norbornene, cyclopentadiene, and 4-ethylidene-8-methyl-1,7-nonadiene are preferable.

The ethylene-α-olefin-non-conjugated polyene copolymer (A) according to the present invention desirably has a limiting viscosity [η] of typically 0.6 to 6.5 dl/g, preferably 0.8 to 6.0 dl/g, more preferably 0.9 to 5.5 dl/g, as measured in decalin at 135° C. If the limiting viscosity [η] measured in decalin at 135° C. falls within these ranges, there is an advantage in that a thermoplastic elastomer well-balanced in mechanical physical properties, rubber elasticity, and processability can be obtained.

The iodine value of the ethylene-α-olefin-non-conjugated polyene copolymer (A) according to the present invention is desirably typically 2 to 50 g/100 g, preferably 5 to 40 g/100 g, more preferably 7 to 30 g/100 g. If the iodine value is below these ranges, crosslinking efficiency in thermoplastic elastomer decreases and rubber elasticity decreases. If the iodine value is above these ranges, crosslinking density is too high thus leading to decreased elongation and possibly deteriorated balance of physical properties.

The ethylene-α-olefin-non-conjugated polyene copolymer (A) according to the present invention has a molecular weight distribution (Mw/Mn) of typically 1.5 to 50, preferably 1.8 to 30, more preferably 2.0 to 6, as measured by GPC. If the molecular weight distribution is below these ranges, the content of a low-molecular-weight component is lower and processability is decreased. If the molecular weight distribution is above these ranges, the content of a low-molecular-weight component is higher and fogging resistance is deteriorated.

The Mooney viscosity [$ML_{1+4}$(100° C.)] of the ethylene-α-olefin-non-conjugated polyene copolymer (A) according to the present invention is preferably 15 to 400. If the Mooney viscosity falls within this range, mechanical physical properties and processability are well-balanced.

[Crystalline Olefin-Based Resin (B)]

Examples of the crystalline olefin-based resins (B) used in the present invention include preferably peroxide-degradable olefin-based plastic.

The term "peroxide-degradable olefin-based plastic" refers to an olefin-based plastic that is thermally degraded through mixing with peroxide and kneading under heating, and thus reduces in its molecular weight and increases in flowability of the resin; examples can include isotactic polypropylene, a copolymer of propylene and a small amount of other α-olefin, such as propylene-ethylene copolymer, propylene-1-butene copolymer, propylene-1-hexene copolymer, and propylene-4-methyl-1-pentene copolymer.

Examples of the peroxide-degradable olefin-based plastic include homopolymers or copolymers of α-olefin having 2 to 20 carbon atoms.

Specific examples of the α-olefins include ethylene, propylene, 1-butene, 1-pentene, 3-methyl-1-butene, 1-hexene, 3-methyl-1-pentene, 4-methyl-1-pentene, and 1-octene.

Specific examples of the peroxide-degradable olefin-based plastic (b) include the following (co)polymers:

(1) homopolymers of propylene,
(2) random copolymers of propylene with 10 mol % or less of other α-olefin,
(3) block copolymers of propylene with 30 mol % or less of other α-olefin,
(4) 1-butene homopolymer,
(5) random copolymers of 1-butene with 10 mol % or less of other α-olefin,
(6) 4-methyl-1-pentene homopolymer, and
(7) random copolymers of 4-methyl-1-pentene with 20 mol % or less of other α-olefin.

The crystalline olefin-based resin (B) used in the present invention has a melt flow rate (MFR: ISO1133, 230° C., a load of 2.16 kg) of typically 5 to 150 g/10 minutes, preferably falling within the range of 30 to 100 g/10 minutes, as measured at 230° C. and a load of 2.16 kg.

Meanwhile, the density is typically 0.90 g/cm$^3$ or more and 0.92 g/cm$^3$ or less, preferably 0.91 g/cm$^3$ or more and 0.92 g/cm$^3$ or less. Here, the density is a density as measured by a pycnometer method (JIS K7112 B method).

As the crystalline olefin-based resin (B) used in the present invention, a copolymer of α-olefin and a small amount of e.g. 10 mol % or less of other polymeric monomer, such as ethylene-vinyl acetate copolymer, ethylene-acrylic acid copolymer, or ethylene-methacrylic acid copolymer may be used.

As the crystalline olefin-based resin (B) used in the present invention, polypropylene is particularly preferable.

Examples of commercially available products of polyolefin resin used in the present invention include Prime Polypro (manufactured by Prime Polymer Co., Ltd.), Mirason (manufactured by Prime Polymer Co., Ltd.), Suntec (manufacture by Asahi Kasei Chemicals Corporation), Novatec (manufactured by Japan Polypropylene Corporation), Sumitomo Noblen (manufactured by Sumitomo Chemical Co., Ltd.), Evolue (manufactured by Prime Polymer Co., Ltd.), Hi-Zex (manufactured by Prime Polymer Co., Ltd.), and polymethylpentene resin (TPX) (manufactured by Mitsui Chemicals, Inc.)

The crystalline olefin-based resin (B) used in the present invention may present in perfectly or partially crosslinked thermoplastic elastomer together with the ethylene-α-olefin-non-conjugated polyene copolymer (A).

Among such perfectly or partially crosslinked thermoplastic elastomer, examples of partially crosslinked thermoplastic elastomers include:

(1) a partially crosslinked thermoplastic elastomer obtained by dynamic heat treatment of a mixture comprising peroxide-crosslinkable olefin-based copolymer rubber (a) and peroxide-degradable olefin-based plastic (b) (crystalline olefin-based resin (B)); or a mixture comprising peroxide-crosslinkable olefin-based copolymer rubber (a), peroxide-degradable olefin-based plastic (b) (crystalline olefin-based resin (B)), and peroxide-noncrosslinkable rubbery material (c) and/or a mineral-oil-based softening agent (d); in the presence of an organic peroxide; and (2) a partially crosslinked thermoplastic elastomer in which a crosslinked rubber composition obtained by dynamic heat treatment of a mixture comprising peroxide-crosslinkable olefin-based copolymer rubber (a), peroxide-degradable olefin-based plastic (b) (crystalline olefin-based resin (B)), and peroxide-noncrosslinkable rubbery material (c) and/or a mineral-oil-based softening agent (d), in the presence of an organic peroxide is homogenously blended with crystalline olefin-based resin (B) (e).

The peroxide-noncrosslinkable rubbery material (c) refers to a hydrocarbon-based rubbery material that will not form crosslinking and will not decrease in flowability even through mixing with peroxide and kneading under heating, such as polyisobutylene, butyl rubber, atactic polypropylene, or propylene-α-olefin copolymer rubber with a propylene content of 50 mol % or more.

The mineral-oil-based softening agent (d) is a high-boiling petroleum fraction typically used in roll processing of rubber for the purpose of weakening intermolecular acting force in the rubber and facilitating the processing, as well as aiding dispersion of carbon black, white carbon, or the like, or alternately decreasing hardness of vulcanized rubber to increase flexibility and elasticity, and is classified into paraffin-based ones, naphthene-based ones, aromatic series-based ones, and the like. Examples of mineral-oil-based softening agents include paraffin-based processed oil and naphthene-based processed oil.

In the thermoplastic elastomer described above, the mass incorporation ratio of the peroxide-degradable olefin-based plastic (b) to the peroxide-crosslinkable olefin-based copolymer rubber (a) (i.e., (b)/(a)) ranges typically within 90/10 to 10/90, preferably within 70/30 to 15/85.

Additionally, when the ethylene-α-olefin-non-conjugated polyene copolymer (A) and other rubber are combined to be used as rubbers, the other rubber is incorporated at a ratio of typically 40 parts by mass or less, preferably 5 to 20 parts by mass, relative to 100 parts by mass of the total amount of peroxide-degradable olefin-based plastic and rubber.

The thermoplastic elastomer preferably used in the present invention is an olefin-based thermoplastic elastomer that consists of crystalline polypropylene and ethylene-α-olefin-non-conjugated diene copolymer, which are present in partially crosslinked forms in the thermoplastic elastomer, in which the mass incorporation ratio of the crystalline polypropylene to the rubber (crystalline polypropylene/rubber) falls within the range of 70/30 to 10/90.

More specific examples of the olefin-based thermoplastic elastomers preferably used in present invention include a thermoplastic elastomer with partial crosslinking of the rubber (a-1), which is obtained by dynamic heat treatment of a mixture that comprises 30 to 90 parts by mass of rubber comprising ethylene-propylene-diene copolymer (a-1), 70 to 10 parts by mass of crystalline polypropylene (b-1) [with the total amount of the components (a-1) and (b-1) being 100 parts by mass], and 5 to 150 parts by mass of rubber (c) other than the rubber (a-1) and/or a mineral-oil-based softening agent (d), in the presence of an organic peroxide.

Specific examples of the organic peroxides include dicumyl peroxide, di-tert-butylperoxide, 2,5-dimethyl-2,5-di-(tert-butylperoxy)hexane, 2,5-dimethyl-2,5-di-(tert-butylperoxy)hexine-3, 1,3-bis(tert-butylperoxyisopropyl) benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxy benzoate, tert-butylperoxy isopropyl carbonate, diacetyl peroxide, lauroyl peroxide, tert-butylcumyl peroxide.

Among these, in terms of odor and scorch stability, 2,5-dimethyl-2,5-di-(tert-butylperoxy)hexane, 2,5-dimethyl-2,5-di-(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate are preferable, and among them, 1,3-bis(tert-butylperoxyisopropyl) benzene is the most preferable.

The organic peroxide is used at a ratio of typically 0.01 to 5 parts by mass, preferably 0.05 to 3 parts by mass, relative to 100 parts by mass of the total amount of crystalline polyolefin and rubber.

In crosslinking treatment by the organic peroxide, a crosslinking aid such as sulfur, p-quinone dioxime, p,p'-dibenzoyl quinone dioxime, N-methyl-N,4-dinitrosoaniline, nitrosobenzene, diphenylguanidine, trimethylolpropane, N,N'-m-phenylenedimaleimide, divinylbenzene, triallyl cyanurate, or triallyl isocyanurate; or polyfunctional methacrylate monomer such as ethylene glycol dimethacrylate, diethylene glycol dimethacrylate, polyethylene glycol dimethacrylate, trimethylolpropane trimethacrylate, or allyl methacrylate; polyfunctional vinyl monomer such as vinyl butyrate, or vinyl stearate can be incorporated.

Use of the compounds as described above can be expected to provide a homogeneous and mild, crosslinking reaction. Particularly, in the present invention, divinylbenzene is the most preferable. Divinylbenzene is easy to handle, has good compatibility with crystalline polyolefin and rubber, which are main components of the crosslinking-treated material, as well as has an effect to solubilize organic peroxide and works as a dispersant for organic peroxide, and therefore, provides a homogeneous crosslinking effect through heat treatment and allows to obtain a thermoplastic elastomer balanced in flowability and physical properties.

The crosslinking aid or polyfunctional vinyl monomer as described above is preferably used at a ratio of 0.01 to 5 parts by mass, particularly 0.05 to 3 parts by mass, relative to 100 parts by mass of the total of the crosslinking-treated materials. If the incorporation ratio of the crosslinking aid or polyfunctional vinyl monomers is over 5 parts by mass, high amount to be incorporated of organic peroxide leads to a crosslinking reaction that progresses too rapidly, thus producing a thermoplastic elastomer with poor flowability, while low amount to be incorporated of organic peroxide leads to remains of the crosslinking aid and polyfunctional vinyl monomers as unreacted monomers in a thermoplastic elastomer and then allows the thermoplastic elastomer to develop change of physical properties due to thermal history during processing and molding, as well. Therefore, the crosslinking aid and polyfunctional vinyl monomer should not be incorporated excessively.

The term "dynamically heat-treat" described above refers to kneading the components as described above in a molten state.

As a kneading apparatus, conventional kneading apparatuses, such as an open type mixing roll or a non-open type apparatus such as Banbury mixer, extruder, kneader, and continuous mixer, are used. Among these, non-open type kneading apparatuses are preferable, and kneading is preferably carried out in an inactive gas environment, such as a nitrogen or carbon dioxide gas environment.

Kneading temperature is typically 150 to 280° C., preferably 170 to 250° C., and kneading time is typically 0.5 to 20 minutes, preferably 1 to 10 minutes. Moreover, shearing force to be applied is determined as a shearing rate within the range of 10 to 50,000 $sec^{-1}$, preferably 100 to 20,000 $sec^{-1}$.

Additionally, perfectly crosslinked thermoplastic elastomer can be prepared by changing condition such as organic peroxide amount to be used and kneading time according to the preparing method for the thermoplastic elastomer in (1) and (2) described above.

[High-Density Polyethylene (C)]

The high-density polyethylene (C) used in the present invention is a component for balancing adhesion and slideability, and the density is typically 0.940 to 0.970 $g/cm^3$, preferably 0.945 to 0.965 $g/cm^3$. Here, the density is a density as measured by a pycnometer method (JIS K7112 B method).

As the high-density polyethylene (C), for example, one comprising ethylene homopolymer or ethylene-α-olefin copolymer such as ethylene-propylene, ethylene-1-butene, ethylene-1-hexene, ethylene-4-methyl-1-pentene, or ethylene-1-octene can be used. Examples of polymerization catalysts used for polymerization of these polymers include known multisite catalysts such as Ziegler-based ones and Philips-based ones, Kaminsky catalysts such as zirconocene, titanocene, and hafnocene (collectively referred to as metallocene), and highly-active single-site catalysts such as post-metallocene catalysts.

The melting point of the high-density polyethylene (C) is typically 110 to 150° C., preferably 115 to 150° C., more preferably 120 to 140° C., in view of adhesion. Here, the melting point is crystal melting peak temperature (Tm) derived from a thermogram measured using differential scanning calorimeter (DSC) at the time that about 10 mg of a sample is elevated in temperature from −40° C. to 200° C. at a heating rate of 10° C./min, maintained at 200° C. for 1 minute, dropped in temperature to −40° C. at a cooling rate of 10° C./min, and again elevated in temperature to 200° C. at a heating rate of 10° C./min.

The melt flow rate (MFR) of the high-density polyethylene (C) is preferably 0.01 to 25 g/10 minutes, more preferably 0.01 to 15, in view of improvement of slideability. Here, the MFR is a value measured in accordance with ASTM D1238, and the measurement condition is 190° C. and a load of 2.16 kg.

[Ethylene-α-Olefin Copolymer (D)]

The ethylene-α-olefin copolymer (D) used in the present invention is a component for improving low-temperature impact strength of a molded product thus obtained, and is amorphous, as well as has a melt flow rate (MFR) of preferably 0.05 to 15 g/10 minutes, more preferably 0.05 to 10, in view of improvement of slideability. Here, the MFR is a value measured in accordance with ASTM D1238, and the measurement condition is 230° C. and a load of 2.16 kg.

The melt flow rate of the ethylene-α-olefin copolymer (D) can be adjusted so as to fall within a desired range by appropriately adjusting degree of polymerization in polymerization of ethylene and α-olefin, which are raw materials.

Moreover, the ethylene-α-olefin copolymer (D) having a density of 0.85 to 0.92 $g/cm^3$ is preferably used. Such range of the density allows for improvement of tensile elongation at break and impact resistance of a molded product thus obtained. The density in the present invention means a value measured in accordance with JIS K 7112 "Methods for Measuring the Density and Specific Gravity of Plastics". To regulate the specific gravity to fall within the range described above, it is only necessary to appropriately adjust the ratio of raw material monomers used in polymerization for the ethylene-α-olefin copolymer (D).

Examples of the ethylene-α-olefin copolymer (D) include ethylene-octene rubber and ethylene-butene rubber.

As a manufacturing method for the ethylene-α-olefin copolymer (D), known polymerization methods using olefin polymerization catalysts are employed. The ethylene-α-olefin copolymer (D) is preferably manufactured by a solution polymerization method, a slurry polymerization method, a high-pressure ion polymerization method, or a vapor phase polymerization method using a Ziegler-Natta catalyst or a complex-based catalyst such as a metallocene complex or non-metallocene complex; or a bulk polymerization method or a solution polymerization method using a radical initiator; or the like. Among them, a method of polymerizing monomers using a Ziegler-Natta catalyst, a complex-based catalyst, or a method of polymerizing monomers in the presence of a metallocene catalyst is particularly preferably employed.

[Silicone Compound (E)]

The silicone compound (E) used in the present invention is added mainly for reducing sliding resistance.

Examples of the silicone compounds used in the present invention include a silicone oil, a high-molecular-weight silicone (silicone gum), and silicone powder, but silicone oil (E-1), preferably a silicone oil having a kinematic viscosity of less than 5000 mm$^2$/s, and high-molecular-weight silicone (silicone gum) (E-2) are preferably used in combination.

The mass incorporation ratio of the silicone oil (E-1) to the high-molecular-weight silicone (silicone gum) (E-2) ((E-1)/(E-2)) ranges typically within 90/10 to 10/90, preferably within 75/25 to 25/75.

Examples of the silicone oils include a dimethylsilicone oil, a phenylmethylsilicone oil, an alkylsilicone oil, a fluorosilicone oil, a tetramethyltetraphenyl trisiloxane, and a modified silicone oil.

As the high-molecular-weight silicone (silicone gum), one with a weight-average molecular weight of 100,000 or more is typically used. The weight-average molecular weight of silicone gum is preferably 100,000 to 800,000, more preferably 450,000 to 650,000. Furthermore, the high-molecular-weight silicone (silicone gum) is preferably non-crosslinked one.

Here, the weight-average molecular weight can be measured, for example, by GPC (gel permeation chromatography) under the following conditions.

[Measurement Condition of Gel Permeation Chromatography (GPC)]
Instrument: HLC-8120 manufactured by Tosoh Corporation
Column: PL 10u Mixed B (7.5 mm I.D×30 cm×2) manufacture by Polymer Laboratories
Detector: differential refractive index detector (RI/built-in)
Solvent: toluene (special grade)
Temperature: 40° C.
Flow rate: 1.0 mL/min
Amount injected: 110 μL
Concentration: 0.1% by mass
Calibration sample: monodispersed polystyrene
Calibration method: polystyrene conversion GPC measurement of the high-molecular-weight silicone (silicone gum) in master batch can be performed by preliminarily conducting, for example, the following treatment to the master batch, separating into a high-molecular-weight silicone (silicone gum) and polypropylene, and then conducting measurement for the high-molecular-weight silicone (silicone gum) thus obtained.

[Separation Treatment of High-Molecular-Weight Silicone (Silicone Gum) and Polypropylene]

First, 0.05 g of a sample (master batch) is weighed, to which is added 10 mL of 0.1 g/L BHT (dibutylhydroxytoluene) in xylene, and then the mixture is stirred at 125° C. for 60 minutes to dissolve the master batch. After the master batch is visually confirmed to be fully dissolved, the solution is left standing at room temperature for about 3 hours to precipitate crystalline polypropylene in the liquid. This solution with precipitated crystals is suction-filtered using Fluoropore FP-100 (1 μm) manufactured by Sumitomo Electric Industries, Ltd., washed with 3 mL of xylene, and separated into CXS [xylene soluble part, high-molecular-weight silicone (silicone gum)] and CXIS (xylene insoluble part, polypropylene). CXS is preliminarily dried up by nitrogen blow with room temperature, and dried in vacuo at 60° C. Vacuum drying is performed until weight loss is not observed. A CXS fraction after vacuum drying is used to perform GPC measurement.

As the high-molecular-weight silicone (silicone gum), for example, BY27-001 manufactured by Dow Corning Toray Co., Ltd., CF-9150 manufactured by Dow Corning Toray Silicone Co., Ltd., X-21-3043 manufactured by Shin-Etsu Chemical Co., Ltd., or X-22-2101 manufactured by Shin-Etsu Chemical Co., Ltd. can be used.

[Thermoplastic Elastomer Composition]

The thermoplastic elastomer composition of the present invention contains 5 to 30 parts by mass of ethylene-α-olefin-non-conjugated polyene copolymer (A), 20 to 40 parts by mass of crystalline olefin-based resin (B), 20 to 40 parts by mass of high-density polyethylene (C), 5 to 12 parts by mass of ethylene-α-olefin copolymer (D), 5 to 9 parts by mass of silicone compound (E) (with the total amount of (A), (B), (C), (D), and (E) being 100 parts by mass). Incorporation of the components (A), (B), (C), (D), and (E) at such proportions allows to balance adhesion of a corner part and slideability of a molded product thus obtained, as well as enables manufacture of a molded product with good low-temperature impact strength such as a glass run channel.

The ethylene-α-olefin-non-conjugated polyene copolymer (A) in an amount to be incorporated less than the lower limit leads to lack of flexibility and generates creases, while that more than the upper limit deteriorates slideability. The crystalline olefin-based resin (B) in an amount to be incorporated less than the lower limit deteriorates moldability, while that more than the upper limit leads to lack of flexibility and generates creases. The high-density polyethylene (C) in an amount to be incorporated less than the lower limit deteriorates slideability, while that more than the upper limit becomes hard and generates creases. The ethylene-α-olefin copolymer (D) in an amount to be incorporated less than the lower limit decreases elongation as well as deteriorates a low-temperature property, while that more than the upper limit leads to softening and deteriorates slideability. The silicone compound (E) in an amount to be incorporated less than the lower limit deteriorates slideability, while that more than the upper limit decreases adhesion of a corner of a molded product thus obtained, as well as also deteriorates low-temperature impact strength.

The thermoplastic elastomer composition of the present invention can be manufactured by employing a method in which at least partially crosslinked ethylene-α-olefin-non-conjugated polyene copolymer (A), crystalline olefin-based resin (B), high-density polyethylene (C), ethylene-α-olefin copolymer (D), and silicone compound (E), and if required, rubber softening agent (e.g., mineral-oil-based softening agent (d) described above), and further other component are melt-kneaded, and then granulated or grinded.

The thermoplastic elastomer composition of the present invention is preferably manufactured by a method in which in terms of slideability, low temperature properties, and flexibility, a mixture containing uncrosslinked ethylene-α-olefin-non-conjugated polyene copolymer (A), crystalline olefin-based resin (B), and organic peroxide, and if required, other component is dynamically heat-treated to produce a thermoplastic elastomer containing partially or perfectly crosslinked ethylene-α-olefin-non-conjugated polyene copolymer (A); and then melt-kneaded with the residual crystalline olefin-based resin (B), high-density polyethylene (C), ethylene-α-olefin copolymer (D), and silicone compound (E), and if required, other component; and then granulated or grinded.

As a kneading apparatus, a mixing roll and an intensive mixer (e.g., a Banbury mixer, a kneader), a uniaxial or biaxial extruder, or the like can be employed, but a closed apparatus is preferable.

[Application of Thermoplastic Elastomer Composition]

The thermoplastic elastomer composition of the present invention can be formed into thermoplastic elastomer molded products by various known molding methods, specifically, for example, by a variety of molding methods such as extrusion molding, press molding, injection molding, calender molding, and hollow molding. Furthermore, the molded products such as sheets obtained by those molding methods can be subjected to secondary processing by heat molding or the like.

The thermoplastic elastomer molded product of the present invention has no particular limitation of application for use thereof, but is preferred to various known applications such as automobile parts, civil work/construction material products, electric/electronic parts, hygiene products, and films/sheets.

The thermoplastic elastomer composition of the present invention allows to balance adhesion of a corner part and slideability of a molded product thus obtained, as well as enables manufacture of a molded product with good low-temperature impact strength, and thus is best suited for manufacturing a molded product with a corner part such as an automotive glass run channel.

The present specification encompassed the contents described in the specification of JP Patent Application No. 2017-072019, the priority of which the present application is based on.

EXAMPLES

Hereinafter, the present invention will be described with reference to the Examples, but the present invention is not limited to these Examples.

Furthermore, hereinafter respective physical properties are measured or evaluated by the following methods.

[Two-Layer Molding]

Two-layer molding was performed with pellets made from the thermoplastic elastomer composition (sliding material) produced in the Examples. Extrusion molding was performed with Milastomer A800B (manufactured by Mitsui Chemicals, Inc.) as a base material under a temperature condition of C1/C2/C3/C4/C5=160/170/180/190/200° C. using a 50 mm single-axis extruder (manufactured by Japan Steel Works, Ltd.) as an extruder. Moreover, for a sliding layer, two-layer molding of the sliding layer was performed under a condition of C1/C2/C3=200/210/230° C. in a 30 mm single-axis extruder (Research Laboratory of Plastics Technology Co., Ltd.) to produce an extruded sheet of base material/sliding material=1.8 mmt/0.2 mmt.

[Shore A Hardness (Instantaneous Value)]

In accordance with JIS K6253, a press sheet with a thickness of 2 mm was doubled and subjected to measurement by Shore A hardness tester.

[Tensile Properties]

Using a 50 t press machine, a sheet sample (thickness of 2 mm) prepared from the thermoplastic elastomer composition (preparation condition: preheated at 230° C. for 8 minutes, and pressured for 6 minutes) as a test sample was subjected to a tensile test under a condition of a measurement temperature of 25° C. and a tensile rate of 500 mm/min and 200 mm/min to measure a tensile strength at break (TB) and a tensile elongation at break (EB).

[Melt Flow Rate (MFR)]

In accordance with ASTM D1238, melt flow rate (MFR) measured at 230° C. and a load of 10 kg was figured out.

[Low-Temperature Brittleness Temperature (Btp)]

Measurement was performed in accordance with ASTM D746.

[Coefficient of Dynamic Friction]

A glass plate with a load of 200 g was placed on the surface of a sample film, and pulled at 0.3 m/min in a direction parallel to the film surface. The force required at that time (g) was measured, then divided by the weight of the glass plate, and expressed as a coefficient of dynamic friction (in accordance with ASTM D 1894-63).

[Adhesion Strength]

Using pellets made from the thermoplastic elastomer compositions (sliding materials) obtained in the Examples and Comparative Examples, melt adhesion test is performed as the following method. At first, a JIS No. 3 dumbbell test strip was punched out from an extruded sheet with a thickness of 2 mm (with a sliding surface thickness of 0.2 mm) to produce a test strip. Then, this dumbbell test strip was split into halves and inserted into a test strip die with 50° C. in a 150 ton injection molding machine (NEX140 manufactured by NSK Ltd.). After that, Milastomer G800BS (olefin-based thermoplastic elastomer, manufactured by Mitsui Chemicals, Inc.) was injected out to produce a dumbbell test strip. (Cylinder temperature was nozzle front part/middle part/back part=250° C./230° C./210° C.) Then, tensile test was performed at a tensile rate of 500 mm/min to evaluate adhesiveness (adhesiveness, adhesive elongation).

[Residual Rate of Film Thickness (after Sliding 10,000 Times)]

Using a glass-run sliding abrasion test machine (NIKKEI ELECTRONIC INSTRUMENTS CO., LTD.), a sliding layer was evaluated using the extruded sheet that is two-layer-molded as described above. Abrasion test was performed using a glass as an abraser. With a load of 3 kgf to the glass and a cycle speed of 1 cycle/second, 10,000 times-sliding test was performed and slideability was evaluated from residual rate of a shaved surface of the glass contact face.

Residual rate=(initial film thickness−shaved film thickness)/(initial film thickness)

Example 1

(1) Manufacture of Thermoplastic Elastomer (a) Containing the Ethylene-α-Olefin-Non-Conjugated Polyene Copolymer (A)

Partially or perfectly crosslinked thermoplastic elastomer (α) was obtained by sufficiently mixing 140 parts by mass of Mitsui EPT (trademark) 3072EPM (ethylene-propylene-ENB copolymer manufactured by Mitsui Chemicals, Inc.) (catalogue value: ethylene content of 64% by mass, ENB content of 5.4% by mass; molar equivalent value [with the total amount of ethylene and propylene being 100 mol %]: ethylene content of 75.8 mol %, propylene content of 24.2 mol %; an amount of extender oil of 40 parts by mass; iodine value of 11.5) as the ethylene-α-olefin-non-conjugated polyene copolymer (A); 40 parts by mass of polypropylene-based resin (trade name: Prime Polypro E-200GP, manufactured by Prime Polymer Co., Ltd., homotype, MFR (230° C., 21.2 N) of 2.0 g/10 minutes, density of 0.90 g/cm$^3$) as the crystalline olefin-based resin (B); 0.3 parts by mass of organic peroxide (1,3-bis(tert-butylperoxyisopropyl)benzene) as a crosslinking agent; 0.3 parts by mass of divinylbenzene as a crosslinking aid; 0.20 parts by mass of a phenol-based antioxidant (trade name: Irganox 1010, manufactured by BASF Japan Ltd.) as an antioxidant; 0.20 parts by mass of benzotriazole-based ultraviolet absorber (trade name: Tinuvin 326FL, manufactured by BASF Japan Ltd.); 0.10 parts by mass of a hindered amine (HALS)-based weathering stabilizer (trade name: Sanol LS-770, manufactured by Sankyo Lifetech Co., Ltd.); 4.0 parts by mass of a carbon black master batch (PE4993, manufactured by Cabot Corporation); and 60 parts by mass of a softening agent (Diana Process PW-100, paraffin oil); by a Henschel mixer, and then extruding and kneading under the following conditions.
(Kneading Condition)
Extruder: product number KTX-46, manufactured by Kobe Steel, Ltd.
Cylinder temperature: C1-C2 120° C., C3-C4 140° C., C5-C14 200° C.
Die temperature: 200° C.
Number of screw rotation: 400 rpm
Extrusion rate: 80 kg/h
(2) Manufacture of the Thermoplastic Elastomer Composition To 25 parts by mass of the partially or perfectly crosslinked thermoplastic elastomer (a) obtained in the process described above, 20 parts by mass of propylene/ethylene random copolymer (crystalline resin) (trade name: Prime Polypro B241, manufactured by Prime Polymer Co., Ltd., density: 0.91 g/cm$^3$, MFR (temperature: 230° C., load: 21.2 N): 0.5 g/10 minutes, density of 0.91 g/cm$^3$) and 10 parts by mass of ultra-high-molecular-weight polyethylene (trade name: Mipelon XM-220, manufactured by Mitsui Chemicals, Inc., weight-average molecular weight of two millions, melting point of 136° C., average particle size of 30 μm) as the crystalline olefin-based resin (B); 40 parts by mass of high-density polyethylene manufactured by Prime Polymer Co., Ltd. (trade name: Hi-Zex 8200B, density=0.95 g/cm$^3$, MFR [190° C., load of 2.16 kg] of 0.03 g/10 minutes by ASTM D1238) as the high-density polyethylene (C); 10 parts by mass of ethylene-octene rubber manufactured by Dow Chemical Co. (trade name: Engage EG8003, MFR [230° C., load of 2.16 kg] of 2 g/10 minutes, density of 0.885 g/cm$^3$) as the ethylene-α-olefin copolymer (D); 10 parts by mass of a silicone master batch (trade name: BY27-001, manufactured by Dow Corning Toray Co., Ltd., pellets with dispersed silicone gum in polypropylene, silicone gum content: 50% by mass) and 4 parts by mass of a silicone oil (trade name: SH200-3000CS, manufactured by Dow Corning Toray Co., Ltd.) as the silicone compound (E) was sufficiently mixed by a Henschel mixer, and then kneaded using an extruder under the following conditions.

Physical properties of the thermoplastic elastomer composition thus obtained are evaluated. The results are shown in Table 1.
(Kneading Conditions)
Extruder: product number KTX-46, manufactured by Kobe Steel, Ltd.
Cylinder temperature: C1-C2 120° C., C3-C4 140° C., C5-C14 200° C.
Die temperature: 200° C.
Number of screw rotation: 400 rpm
Extrusion rate: 80 kg/h Comparative Examples 1-5

Pellets of thermoplastic elastomer composition were manufactured in a similar manner as Example 1 except that in Example 1(2), the incorporation ratio of each component was changed as described in Table 1.

The pellet thus obtained is used to evaluate physical properties. The results are shown in Table 1.

Besides, Comparative Example 3 employed propylene-α-olefin copolymer (trade name: Tafmer XM-7070, manufactured by Mitsui Chemicals, Inc.) as crystalline olefin-based resin (B).

TABLE 1

| | | Example 1 | Comparative Example 1 | Comparative Example 2 | Comparative Example 3 | Comparative Example 4 | Comparative Example 5 |
|---|---|---|---|---|---|---|---|
| Formulation | Thermoplastic elastomer (α) | 25 | 25 | 25 | 25 | 25 | 25 |
| | B241 | 20 | 20 | 20 | 20 | 20 | 20 |
| | XM-220 | 10 | 10 | 10 | 10 | 10 | 10 |
| | 8200B | 40 | 40 | 40 | 40 | 40 | 40 |
| | EG8003 | 10 | | 20 | | 10 | 10 |
| | XM-7070 | | | | 10 | | |
| | BY27-001 | 10 | 10 | 10 | 10 | 4 | 5 |
| | SH200-3000CS | 4 | 4 | 4 | 4 | 10 | 1 |
| | Incorporation ratio (with the total amount of (A), (B), (C), (D), and (E) being 100) | | | | | | |
| | Component (A) | 9.39 | 10.35 | 8.60 | 9.39 | 9.39 | 10.14 |
| | Component (B) | 36.09 | 39.77 | 33.04 | 45.33 | 33.32 | 36.48 |
| | Component (C) | 36.96 | 40.72 | 33.83 | 36.96 | 36.96 | 39.91 |

TABLE 1-continued

|  |  |  | Example 1 | Comparative Example 1 | Comparative Example 2 | Comparative Example 3 | Comparative Example 4 | Comparative Example 5 |
|---|---|---|---|---|---|---|---|---|
|  | Component (D) |  | 9.24 | 0.00 | 16.92 | 0.00 | 9.24 | 9.98 |
|  | Component (E) |  | 8.32 | 9.16 | 7.61 | 8.32 | 11.09 | 3.49 |
|  | Total |  | 100.00 | 100.00 | 100.00 | 100.00 | 100.00 | 100.00 |
| Result | Shore A hardness (instantaneous value) |  | 45 | 45 | 43 | 43 | 45 | 45 |
|  | TB | Stretch rate: 500 mm/min  MPa | 12.0 | 12.0 | 12.0 | 12.0 | 12.0 | 12.0 |
|  | EB | Stretch rate: 500 mm/min  % | 160 | 40 | 250 | 140 | 70 | 70 |
|  | TB | Stretch rate: 200 mm/min  MPa | 11.9 | 11.0 | 11.0 | 11.0 | 11.9 | 11.9 |
|  | EB | Stretch rate: 200 mm/min  % | 110 | 30 | 140 | 100 | 60 | 60 |
|  | MFR | g/10 min | 15 | 15 | 15 | 15 | 15 | 15 |
|  | Btp | ° C. | −34 | −10 | −36 | −20 | −18 | −36 |
|  | Coefficient of dynamic friction |  | 0.35 | 0.28 | 0.43 | 0.30 | 0.38 | 0.54 |
|  | Adhesion strength | MPa | 2.2 | 1.3 | 2.4 | 2.1 | 1.9 | 2.5 |
|  | Adhesive elongation | % | 110 | 60 | 150 | 100 | 60 | 170 |
|  | Residual rate of film thickness (after sliding 10,000 times) | % | 70 | 80 | 40 | 60 | 70 | 30 |

All publications, patents, and patent applications cited herein are incorporated herein by reference in their entirety.

The invention claimed is:

1. A thermoplastic elastomer composition comprising 5 to 30 parts by mass of ethylene-α-olefin-non-conjugated polyene copolymer (A), 20 to 40 parts by mass of crystalline olefin-based resin (B) having a density of 0.90 g/cm³ or more and 0.92 g/cm³ or less, 20 to 40 parts by mass of high-density polyethylene (C) having a density of 0.94 g/cm³ or more and 0.97 g/cm³ or less, 5 to 12 parts by mass of ethylene-α-olefin copolymer (D) consisting of ethylene and α-olefin having 3 to 12 carbon atoms, and 5 to 9 parts by mass of silicone compound (E) (with the total amount of (A), (B), (C), (D) and (E) being 100 parts by mass).

2. The thermoplastic elastomer composition according to claim 1, wherein the silicone compound (E) comprises a silicone oil and a high-molecular-weight silicone.

3. The thermoplastic elastomer composition according to claim 2, wherein the ethylene-α-olefin copolymer (D) comprises one or more selected from ethylene-octene rubber and ethylene-butene rubber.

4. The thermoplastic elastomer composition according to claim 1, wherein the ethylene-α-olefin copolymer (D) comprises one or more selected from ethylene-octene rubber and ethylene-butene rubber.

5. An automotive glass run channel formed from the thermoplastic elastomer composition according to claim 1.

6. The automotive glass run channel according to claim 5, wherein the silicone compound (E) comprises a silicone oil and a high-molecular-weight silicone.

7. The automotive glass run channel according to claim 6, wherein the ethylene-α-olefin copolymer (D) comprises one or more selected from ethylene-octene rubber and ethylene-butene rubber.

8. The automotive glass run channel according to claim 5, wherein the ethylene-α-olefin copolymer (D) comprises one or more selected from ethylene-octene rubber and ethylene-butene rubber.

* * * * *